July 14, 1931.  G. R. METCALF, JR  1,814,478
CONNECTER FITTING
Filed April 4, 1928

George P. Metcalf Jr. INVENTOR.

BY

ATTORNEY.

Patented July 14, 1931

1,814,478

UNITED STATES PATENT OFFICE

GEORGE R. METCALF, JR., OF ERIE, PENNSYLVANIA, ASSIGNOR TO ERIE MALLEABLE IRON COMPANY, OF ERIE, PENNSYLVANIA, A CORPORATION OF PENNSYLVANIA

CONNECTER FITTING

Application filed April 4, 1928. Serial No. 267,433.

The present invention is designed to connect two devices, particularly devices such as threadless conduits and conduit fittings and the invention is so exemplified. Features and details of the invention will appear more fully from the specification and claim.

A preferred embodiment of the invention is illustrated in the accompanying drawings as follows:—

Figure 1:
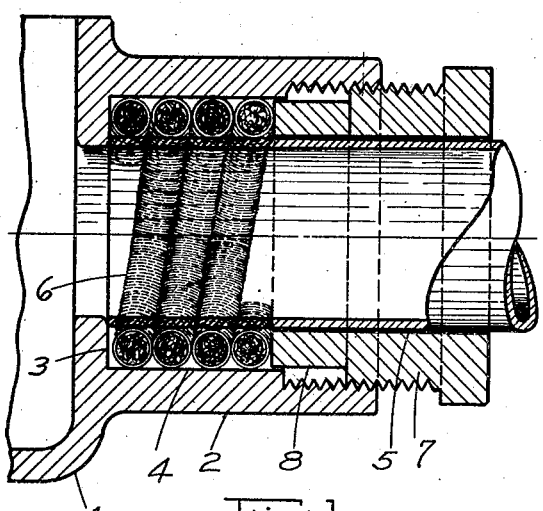

Fig. 1 is a central section through a conduit fitting showing the construction.

Figure 2:
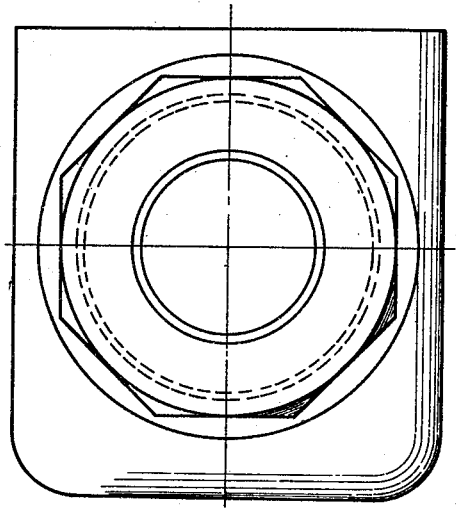

Fig. 2 an end view of the same.

Figures 3, 4:
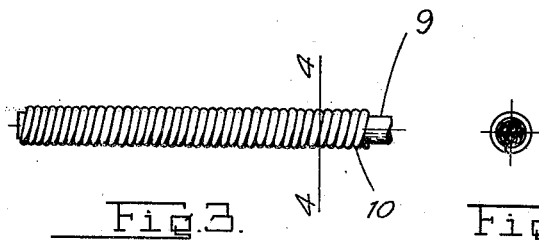

Fig. 3 a fragment of the locking device.

Fig. 4 a section on the line 4—4 in Fig. 3.

1 marks the body of a conduit box, 2 an extension thereon which is interiorly screwthreaded at its outer end. This is provided with a guard shoulder 3 at its inner end, the depth of the shoulder forming in effect a socket with the surrounding walls 4. A conduit 5 is arranged in the socket and against the guard shoulder.

Arranged in the socket is a gripping device 6 which, for convenience is arranged in spiral form around the conduit. A screw 7 has an extension 8 engaging the gripping device and places the same under pressure.

The gripping device has a center, or filler 9 which is made of yieldable or deformable material, such as rubber, but has little compressibility. This is surrounded by a coil of wire 10 which forms an armor around the central portion 9. When this material is put under pressure of the screw the filler is deformed, tending, however, to maintain the same total cross section. This puts expanding strain on the armor, or coil, which tends to hold this armor in circular form in cross section but incident to the pressure and the fact that it is confined by the outer wall the inner edges of the coils are forced inwardly as the cross section is deformed under pressure and the wires of the armor engaging the conduit tend to embed themselves in the conduit and thus form an efficient gripping means.

What I claim as new is:—

In a connecter fitting, the combination of a walled socket; a gripping device in the socket comprising a plurality of annular wraps of deformable non-compressible filler and a hard wire armor for the filler, the wire encircling the filler and having a cross sectional shape forming ribs on the surface of the device, said wraps giving to the device a tubular form; and means compressing the device axially in the socket to change its dimension radially and adapted to force the wire-formed ribs into clamping and gripping engagement with an inserted member.

In testimony whereof I have hereunto set my hand.

GEORGE R. METCALF, Jr.